US009106516B1

(12) United States Patent
Palmans et al.

(10) Patent No.: US 9,106,516 B1
(45) Date of Patent: Aug. 11, 2015

(54) ROUTING AND ANALYZING BUSINESS-TO-BUSINESS SERVICE REQUESTS

(75) Inventors: Frank L. O. Palmans, San Jose, CA (US); Ammar Rayes, San Ramon, CA (US); James McDonnell, Pleasanton, CA (US); Vikrant Dev Andotra, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 444 days.

(21) Appl. No.: 13/439,718

(22) Filed: Apr. 4, 2012

(51) Int. Cl.
   *G06F 15/173* (2006.01)
   *H04L 12/24* (2006.01)
   *G06F 21/55* (2013.01)

(52) U.S. Cl.
   CPC .............. *H04L 41/06* (2013.01); *G06F 21/552* (2013.01); *H04L 41/5074* (2013.01)

(58) Field of Classification Search
   CPC ............ G06F 21/552; G06F 17/30893; G06F 11/0709; G06F 11/0769; G06F 11/0781; G06F 2201/86; G06F 2201/765; G06F 2221/2137; G06F 11/0757; G06F 11/324; H04L 41/06; H04L 41/5061; H04L 12/2602; H04L 41/5074; H04L 41/18
   USPC ...................... 709/203, 223–224, 230; 705/8, 705/7.11–7.42
   See application file for complete search history.

(56) References Cited

U.S. PATENT DOCUMENTS

| | | | |
|---|---|---|---|
| 6,032,184 A * | 2/2000 | Cogger et al. ................ 709/223 |
| 2002/0123983 A1 * | 9/2002 | Riley et al. ........................ 707/1 |
| 2002/0194319 A1 * | 12/2002 | Ritche ............................ 709/223 |
| 2003/0110228 A1 * | 6/2003 | Xu et al. ........................ 709/207 |
| 2003/0154118 A1 * | 8/2003 | Druyan et al. ..................... 705/8 |
| 2004/0225513 A1 * | 11/2004 | Haeberle et al. .................. 705/1 |
| 2005/0097224 A1 * | 5/2005 | Chen et al. ..................... 709/246 |
| 2006/0059107 A1 * | 3/2006 | Elmore et al. ................... 705/64 |
| 2006/0059253 A1 * | 3/2006 | Goodman et al. ............. 709/223 |
| 2007/0162973 A1 * | 7/2007 | Schneier et al. ................. 726/22 |
| 2007/0208878 A1 * | 9/2007 | Barnes-Leon et al. ......... 709/246 |
| 2007/0226249 A1 * | 9/2007 | Kacin et al. .................... 707/102 |
| 2009/0043882 A1 * | 2/2009 | Hibbets et al. ................ 709/224 |
| 2009/0164631 A1 * | 6/2009 | Wooley .......................... 709/225 |
| 2011/0178831 A1 * | 7/2011 | Ravichandran .............. 705/7.11 |

* cited by examiner

*Primary Examiner* — Wing F Chan
*Assistant Examiner* — Benjamin M Thieu
(74) *Attorney, Agent, or Firm* — Patterson + Sheridan, LLP (57) ABSTRACT

In one embodiment, a central service request management system for managing service requests across a plurality of ticketing systems. The central service request management system includes translation logic for receiving service request messages from the plurality of ticketing systems and translating the service request messages to a standardized format, where each service request message is associated with a respective service request. Additionally, the central service request management system includes data storage logic for maintaining a status of service requests based on the translated service request messages. The central service request management system further includes routing logic for identifying one of the plurality of ticketing systems to transmit each translated service request message to based on the maintained status of the service request associated with the service request message, and for transmitting the translated service request message to the identified ticketing system.

19 Claims, 5 Drawing Sheets

ROUTING AND ANALYZING BUSINESS-TO-BUSINESS SERVICE REQUESTS

TECHNICAL FIELD

Embodiments presented in this disclosure generally relate to service requests, and more specifically to centrally managing service requests across a plurality of ticketing systems.

BACKGROUND

Businesses today frequently enter into service agreements for the support of a variety of different items. Such service agreements may relate to the support of hardware (e.g., a router) and/or software (e.g., an enterprise application). Additionally, some service agreements may be multi-level service agreements involving multiple parties. For instance, such a multi-level service agreement could specify various responsibilities and obligations for each of the parties to the agreement. For example, a particular business could enter into a multi-level service agreement for the service of a specific router with a first partner who provides first level support for the router, and additionally with a vendor who provides second level support for the router and to which a service request can be escalated.

While a multi-level service agreement for a single item between only a few parties may be relatively simple to manage, a multi-level service agreement can become quite complex when a substantial number of parties and supported items are involved. For example, a multi-level service agreement for an enterprise application could include provisions for the support of the enterprise application itself, provisions for the support of the hardware on which the enterprise application runs, provisions for the support of the network over which the enterprise application communicates, and so on, with the support of each different item assigned to one or more parties. In such an example, it may be important for the various parties to communicate with one another in attempting to resolve an issue, as dependencies could exist between the various items. For instance, a problem with the hardware on which the enterprise application runs could also create problems for the enterprise application itself. However, managing these communications for a complex service agreement can quickly become a challenge, as each of the parties involved may use a different ticketing system, each with a different communications protocol.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Embodiments provide a method, system and computer program product for managing service requests across a plurality of ticketing systems. The method, system and computer program product include receiving service request messages from the plurality of ticketing systems, wherein each service request message is associated with a respective service request. Additionally, the method, system and computer program product include translating the received service request messages to a standardized format. The method, system and computer program product further include maintaining a status of one or more service requests based on the translated service request messages. Also, the method, system and computer program product include identifying one of the plurality of ticketing systems to transmit each translated service request message to, based on the maintained status of the service request associated with each service request message. The method, system and computer program product further include transmitting the translated service request message to the identified ticketing system.

Description of Example Embodiments

As the number of parties involved in a service agreement grows, the complexity of managing the service agreement increases as well. As such, in such a service agreement involving a substantial number of parties, it can become challenging for a given one of the parties to know who is currently responsible for resolving a particular issue. Additionally, even if the party knows who is currently responsible for resolving the issue, the party may not be privy to information on how the issue is being resolved, information that could otherwise aid the party in resolving future issues.

For example, assume a customer enters into a service agreement with a support partner and a vendor for the service of a particular router, where the partner provides first level support for the router and the vendor provides top level support for the router. If the customer then experiences a problem with the router, the customer may contact the partner directly with a service request under the service agreement for assistance in resolving the issue with the router. If the partner is unable to resolve the issue on their own, the partner may then escalate the service request directly to the vendor. For purposes of this example, assume that the vendor then addresses the problem with the router by updating the router's firmware to a particular new version. While the partner in this example has direct contact with the vendor and may be able to access information regarding how the vendor resolved the problem, the customer in this example only has direct contact with the partner and thus can only see that the partner has escalated the service request and that ultimately the issue was resolved. As such, the customer in this example may be unaware of how the issue was resolved.

Such a situation is less than optimal, because the customer could potentially use the information on how the issue was resolved to resolve future issues or to prevent future issues for occurring. For instance, if the customer owns multiple instances of the same router, the customer could preemptively upgrade the firmware on all the other instances of the router in order to prevent future issues from occurring. However, without access to the information on how the issue was resolved, the customer may have no way of knowing how to prevent these future issues.

As another example, the customer could contact the partner with a service request for assistance in resolving the router issue and the partner could resolve the issue without help from or interaction with the vendor. In this case, the vendor could benefit from knowing information about the service request, such as, without limitation, what issue occurred, the circumstances in which the issue occurred, and how the partner ultimately resolved the issue. Such information could be useful to the vendor for use in, for instance, detecting, resolving or even preventing other issues from occurring for the customer or for other customers. While in some circumstances the partner may be unwilling to share such information with the vendor unless the partner receives some value (e.g., other value added information, monetary compensation, etc.) from the vendor, in other circumstances the partner may be completely willing to freely share this information. However, because the vendor was not involved in the transaction between the customer and the partner, the vendor may have no way of knowing this information.

Figure 1:
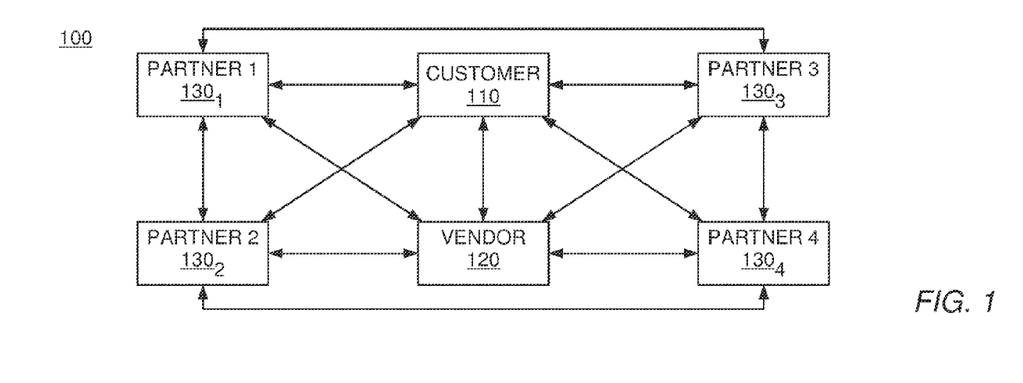
FIG. 1 is a diagram illustrating a network topology of a system for managing service agreements, according to one embodiment described herein.

Additionally, in a system in which each party communicates directly with each other party, the network communications logic can become increasingly complex for each additional party added. For example, FIG. 1 shows a diagram illustrating a network topology of a system for managing service agreements. In the depicted environment 100, a customer ticketing system 110 is configured to communicate directly with a vendor ticketing system 120 as well as a plurality of partner ticketing systems $130_{1-4}$, for the purposes of carrying out a multi-level service agreement. As shown, each of the various ticketing systems 110, 120 and $130_{1-4}$ are configured to communicate directly with each and every other one of the systems. Furthermore, as each of the various ticketing systems 110, 120 and $130_{1-4}$ may use a different protocol for maintaining service request information. As an example, the customer ticketing system 110 could use a "PENDING" status message for a particular service request, while the vendor ticketing system 120 could use a "3" status code and the partner ticketing system $130_1$ could use a "REQUEST_PENDING" status message to indicate the same state for the service request.

Thus, in such an embodiment, each of the various ticketing systems 110, 120 and $130_{1-4}$ must be configured with logic for translating service request information to each of the other ticketing system protocols. Furthermore, for a new ticketing system to be incorporated into the environment 100, the new ticketing system would have to be configured with logic for communicating with each of the other ticketing systems 110, 120 and $130_{1-4}$, and each of the other ticketing systems 110, 120 and $130_{1-4}$ would have to be configured with logic for communicating with the new ticketing system. As such, many undesirable complexities are introduced as a result of the ticketing systems communicating directly with each other.

Figure 2:
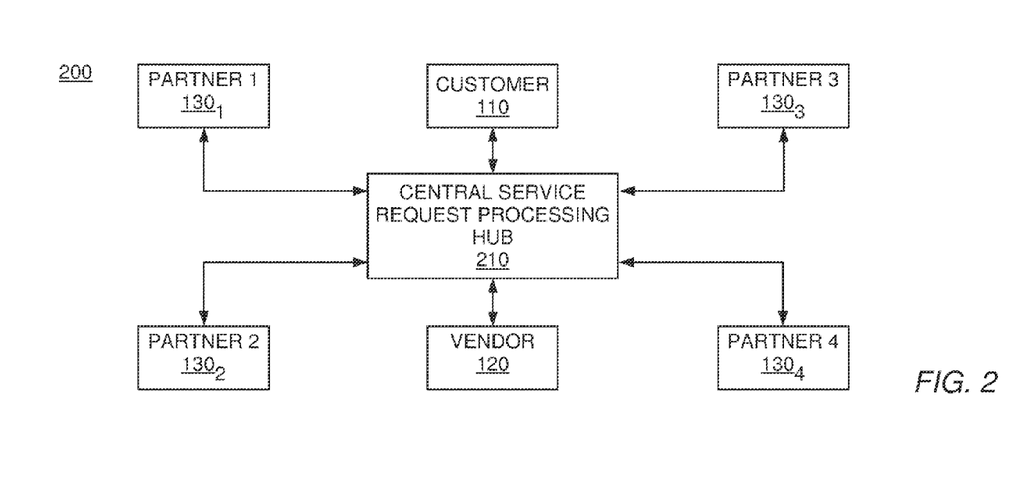
FIG. 2 is a diagram illustrating a network topology of a centralized system for managing service agreements, according to one embodiment described herein.

Accordingly, embodiments provide a centralized service request management system for managing service requests across a plurality of ticketing systems. An example of such a system is depicted in FIG. 2, which shows a diagram illustrating a network topology of a centralized system for managing service agreements, according to one embodiment described herein. As shown, the environment 200 includes the customer ticketing system 110, the vendor ticketing system 120, and the plurality of partner ticketing systems $130_{1-4}$, all connected to a central service request processing hub 210.

Generally, the central service request processing hub 210 is configured to receive service request messages from the various ticketing systems 110, 120 and $130_{1-4}$ and to route the received messages to an appropriate one or more of the ticketing systems 110, 120 and $130_{1-4}$. Here, each service request message may be associated with a respective service request, and a particular service request can be associated with a plurality of service request messages sent to and from multiple parties to the service agreement. For example, a first service request message could be transmitted by the customer ticketing system 110 to a partner responsible for handling first level support when an issue is first discovered. However, rather than transmitting the service request messages directly to another one of the ticketing systems 110, 120 and $130_{1-4}$, the customer ticketing system 110 may transmit the service request message to the central service request processing hub 210. The central service request processing hub 210, in turn, could then route the service request message to an appropriate one of the ticketing systems 110, 120 and $130_{1-4}$. Thus, continuing the above example, the central service request processing hub 210 could route the service request message to the partner ticketing system $130_1$ to provide the first level support for the discovered issue.

As discussed above, each of the various ticketing systems 110, 120 and $130_{1-4}$ may operate using a different format with regard to service requests. For instance, while each of the ticketing systems 110, 120 and $130_{1-4}$ may maintain a status of a particular service request, the ticketing systems 110, 120 and $130_{1-4}$ may represent such a status using different formats. As an example, assume that the service request transmitted by the customer relates to high CPU usage occurring on a router owned by the customer and covered by a service agreement. In such an example, the customer ticketing system 110 could identify the issue using the status message "HIGH CPU USAGE", while the partner ticketing system $130_1$ could identify the same issue using the error code "2701", and the other ticketing systems 120 and $130_{2-4}$ could identify the same issue in different ways as well. Accordingly, the central service request processing hub 210 could be configured to translate an incoming service request message before routing the message to another one of the ticketing systems. For instance, using the above example, the central service request processing hub 210 could be configured with translation logic that would convert the status message "HIGH CPU USAGE" into the error code "2701", before the service request is routed to the first level support partner (i.e., the partner ticketing system $130_1$). In some circumstances, a particular ticketing system may not have a corresponding state (or code) for a state used by another ticketing system. In such an example, the central service request processing hub 210 could be configured to replace the state with a placeholder state (e.g., an explicitly defined placeholder state, a blank state, no state at all, etc.) when transmitting the translated service request message to the other ticketing system.

Additionally, a service request processing component may be configured to differentiate between free text state descriptions and codes/names for predefined states. For example, a first ticketing system could allow users to freely enter text into the state field for a particular issue, while a second ticketing system could use a plurality of predefined states for all issues managed by the second ticketing system. In such an example, the state of "HIGH CPU USAGE" could simply be viewed a textual string entered by a user in the first ticketing system, while the same text could correspond to a predefined state in the second ticketing system. As such, the service request processing component could be configured with logic to determine the format (e.g., free text vs. predefined fields) each party uses to represent particular service-request data and to use this knowledge in translating the data from one format to another. Additionally, the service request processing component could use this information to determine the correct recipient to forward a particular service request to, thereby reducing the chances of the service request message bouncing back and forth between multiple parties.

Generally, the central service request processing hub 210 may be configured to determine one or more of the other ticketing systems 110, 120 and 130$_{1-4}$ to route incoming service request messages to and to then route the messages accordingly. For example, the central service request processing hub 210 may be configured with logic for determining which of the ticketing systems 110, 120 and 130$_{1-4}$ is responsible for handling a particular service request under the service agreement. Such a determination may be based on, for instance, a current status of the service request. As an example, upon receiving the aforementioned service request message from the customer ticketing system 110, the central service request processing hub 210 could access a local data store containing information on pending service requests. Upon determining that the received service request message does not relate to any pending service requests, the central service request processing hub 210 could determine that the received message relates to a new service request. The central service request processing hub 210 could then update the data store based on this new service request and could then access service agreement information to determine which ticketing system is responsible for the first level support for the new service request. For purposes of this example, assume that the central service request processing hub 210 determines that partner 1 is responsible for handling the first level support. The central service request processing hub 210 could then translate the received message into a format recognized by the partner ticketing system 130$_1$ and transmit the translated message to the partner ticketing system 130$_1$.

If the partner is unable to address the issue for the service request, the partner ticketing system 130$_1$ could transmit a second service request message for the service request to the central service request processing hub 210. The service request message could specify, for instance, information identifying a service request associated with the message, an item being serviced by the service request, a service agreement covering the service request, a current status of the service request, and so on. Upon receiving the second message, the central service request processing hub 210 could access the data store and determine that the second message relates to a pending service request. The central service request processing hub 210 could further access the service agreement data and determine that the vendor is responsible for the top level support for the issue under the service agreement. Accordingly, the central service request processing hub 210 could translate the second message into a format recognized by the vendor ticketing system 120 and could then transmit the translated second message to the vendor ticketing system 120. The central service request processing hub 210 may also update the data for the service request in the data store accordingly. Continuing the example, upon resolving the issue, the vendor could transmit a third service request message to the central service request processing hub 210, indicating that the issue has been resolved and that the service request should be closed.

As discussed above, one disadvantage to a system where each of the various ticketing systems communicates directly with each and every other one of the ticketing systems is that each individual ticketing system may not have access to all the information relating to a particular service request. However, such information (e.g., how the issue was ultimately resolved) may be useful for determining how to remedy future issues or even to prevent future issues from occurring. Accordingly, the central service request processing hub 210 may be configured to process queries for service request information from each of the ticketing systems 110, 120 and 130$_{1-4}$, as well as other computer systems. Thus, for instance, once the service request has been resolved by the vendor, the customer could submit a query to the central service request processing hub 210 requesting information on how the vendor resolved the issue. The central service request processing hub 210 could then return the requested information to the customer. In one embodiment, the central service request processing hub 210 is further configured to authenticate and authorize the customer with respect to the requested information, before returning the information to the customer. Advantageously, doing so enables the parties to the service agreement to access useful information related to various service requests, information which the parties may then use to resolve and/or prevent subsequent issues.

In one embodiment, the central service request processing hub 210 is further configured to analyze service request information collected from service request messages passing through the central service request processing hub 210 and to identify patterns of issues. For example, the central service request processing hub 210 could determine that a substantial number of service requests relate to a particular type of router having high CPU usage issues. Upon detecting the pattern, the central service request processing hub 210 could determine how these cases of high CPU usage on the router have been resolved (i.e., based on the service request message passing through the central service request processing hub 210). The central service request processing hub 210 could then use this resolution information to notify various parties as to preferred way(s) of resolving the high CPU usage issue, should it arise again on other routers in the future. For example, if the central service request processing hub 210 determines that a substantial number of service requests were resolved by disabling a particular service on the routers, the central service request processing hub 210 could notify the parties that disabling the particular service is a preferred method of resolving the issue. Additionally, the central service request processing hub 210 may use the determined patterns to suggest preventative maintenance to the parties. As an example, if the high CPU usage issue has also been resolved in other service requests by installing an updated version of the firmware for the router, the central service request processing hub 210 could suggest that the parties update their routers' firmware to the updated version in order to prevent the high CPU usage issue from occurring. Of course, these examples are provided for illustrative purposes only and without limitation, and more generally embodiments can pertain to any issue and solution consistent with the present disclosure.

In a particular embodiment, the central service request processing hub 210 further contains centralized recommendation data. Generally, the centralized recommendation data represents information relating to issues reported to the central service request processing hub 210 (e.g., through service requests flowing through the hub 210), how these issues have been resolved historically and recommended techniques for resolving future occurrences of these issues. The service request processing component 300 could be configured to transmit this recommendation data to various parties involved in the service agreement or to third parties. For instance, particular parties could subscribe to recommendation data and/or certain types of recommendation data. The service request processing component 300 could then be configured to transmit the corresponding recommendation to the subscribed parties. For example, the service request processing component 300 could periodically process the centralized recommendation and send out recommendation information on recently resolved issues to the relevant subscribers. In one embodiment, the service request processing component 300 could further be configured to process queries for the recommendation data from parties to the service agreement or from third parties. For instance, one of the parties could submit a query requesting recommendation information on a particular issue and, in response to the query, the service request processing component 300 could return recommendation data corresponding to the specified issue to the requesting party.

As discussed above, in some circumstances, a party may be unwilling to share particular service request information with other parties without receiving some compensation (e.g., value added information, monetary compensation, etc.) from the other parties in exchange. As such, the service request processing component 300 could be configured to selectively send or refuse to send particular information (or summaries of information) to the various parties. For instance, the service request processing component 300 could transmit recommendation data related to a particular issue to only the subscribers who are authorized to receive the recommendation data. As an example, a particular party could restrict the recommendation information related to the particular party's service requests to only other parties who have a mutual information sharing agreement with the particular party. In such an example, the service request processing component 300 could transmit the recommendation information related to the particular party's service requests only to subscribers who have a mutual information sharing agreement with the particular party, and could restrict access to this recommendation information for all other parties.

Figure 3:
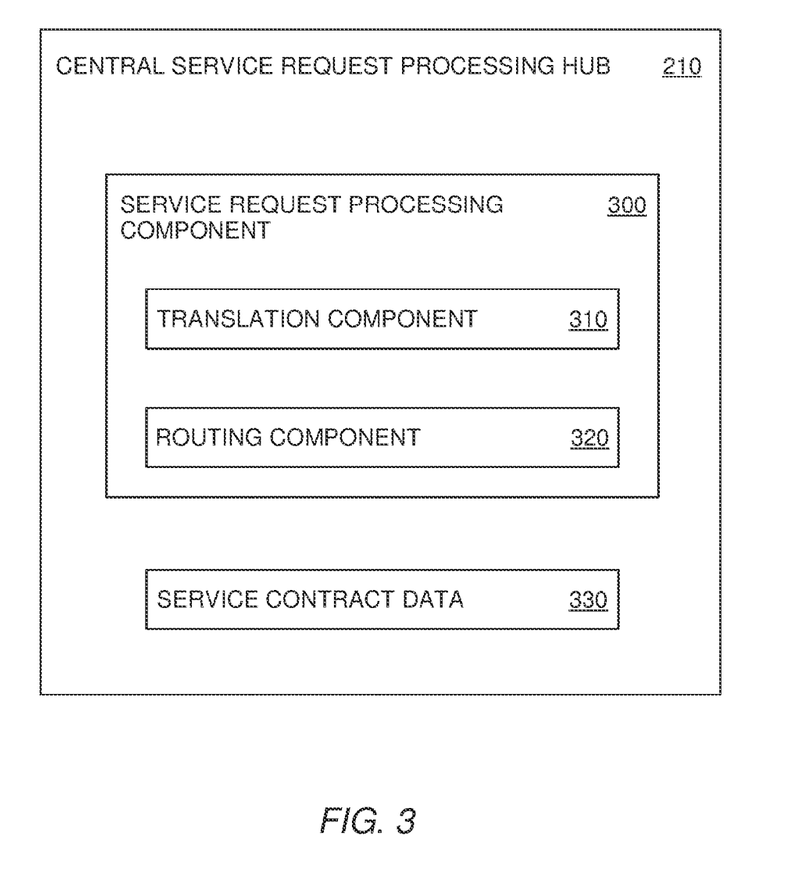
FIG. 3 is a block diagram illustrating a central service request processing hub, according to one embodiment described herein.

A more detailed depiction of the central service request processing hub 210 is shown in FIG. 3, which is a block diagram illustrating a central service request processing hub, according to one embodiment described herein. As shown, the central service request processing hub 210 includes a service request processing component 300 and service contract data 330. Generally, the service contract data 330 represents information describing one or more service agreements that the service request processing component 300 is configured to manage. Such data 330 may specify one or more items covered by the service agreement and could further specify the various responsibilities and obligations of various parties to the service agreement. The data 330 may also contain information on a list of pending service requests and a status for each of the pending service requests, as well as information on resolved service requests and how the service requests were resolved. As discussed above, the service request processing component 300 may be configured to process queries for information stored in the service contract data 330, such as the manner in which particular service requests were resolved historically. The service request processing component 300 may also analyze the service contract data 330 in order to identify patterns of issues across the hardware and/or software items covered by the service agreement. The service request processing component 300 may then use the identified patterns to generate notifications warning of particular issues known to occur or to suggest preventative measures to prevent these issues from occurring.

As shown, the service request processing component 300 contains a translation component 310 and a routing component 320. As discussed above, the translation component 310 is generally configured to translate service request messages to formats used by various ticketing systems to which the service request messages are being routed. In one embodiment, the translation component 310 is further configured to translate data within the service request messages to a standardized format used by the service request processing component 300. That is, while each of the various ticketing systems may use a different format for their respective service requests, the service request processing component 300 may use a standardized format for maintaining the status on the various service requests. Accordingly, the translation component 310 could be configured to translate the service request messages from the different formats used by the various ticketing systems to the standardized format used by the service request processing component 300.

The routing component 320 is generally configured to determine one or more of the ticketing systems to transmit incoming service requests to. For example, upon receiving a service request message, the routing component 320 could access the service contract data 330 and identify the status of the service request associated with the received service request message. The routing component 320 could use the service contract data 330 to determine which party is responsible for processing the service request in its current state. The routing component 320 could then transmit the service request message to the determined party. In one embodiment, the routing component 320 is configured to transmit a translated service request message to the determined party, the translated message having been translated by the translation component 310 to be compatible with a format used by the determined party.

Figure 4:
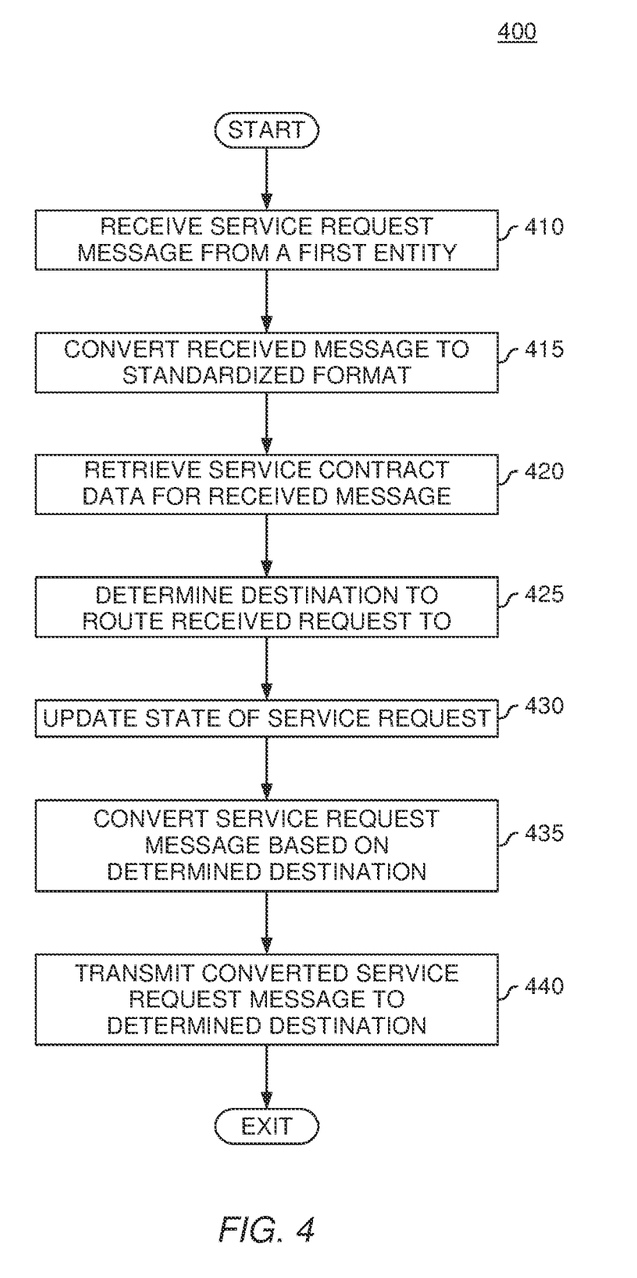
FIG. 4 is a flow diagram illustrating a method for managing service requests, according to one embodiment described herein.

FIG. 4 is a flow diagram illustrating a method for managing service requests, according to one embodiment described herein. As shown, the method 400 begins at step 410, where the service request processing component 300 receives a service request message from a first entity. The first entity could be, for example, a customer's ticketing system once a new issue has been detected. The translation component 310 of the service request processing component 300 then converts the received service request message to a standardized format used by the service request processing component 300 (step 415).

Additionally, the routing component 320 of the service request processing component 300 retrieves service contract data for the service request associated with the service request message (step 420). As discussed above, such service contract data could specify, for instance, the responsibilities of each party to the service agreement. Additionally the service contract data may specify a current status of each pending service request. Such a current status may be maintained by the service request processing component 300, based on the content of incoming service request messages.

Upon retrieving the service contract data, the routing component 320 determines a destination to route the service request message to (step 425). For instance, the routing component 320 could determine the destination based on the content of the service request message. As an example, if the service request message specifies that a particular issue should be escalated, the routing component 320 could analyze the service contract data to determine which party to the service agreement is responsible for handling the escalated issue. Such a determination may also be based on the entity from which the service request message was received. As another example, if the service request message specifies that a particular issue has been resolved, the routing component 320 could analyze the service contract data to determine which entities are involved in the processing of the service request and accordingly should be notified that the issue has been resolved.

The service request processing component 300 then updates the local status of the service request associated with the service request message (step 430). For instance, such a status update could indicate, without limitation, that the service request has been escalated and who the service request was escalated to, or could indicate that the service request should be closed because the issue has been resolved. More generally, however, any status reflecting the state of a service request may used, consistent with the various embodiments described herein.

Additionally, the translation component 310 converts the service request message to a format based upon the determined destination (step 435). That is, since the various parties to the service contract may each maintain service request information in a different format, the translation component 310 of the service request processing component 300 is configured to translate the service request message into a format compatible with by the determined destination. The routing component 320 then transmits the converted service request message to the determined destination (step 440), and the method 400 ends. Advantageously, the method 400 allows for centralized management of service requests across a plurality of different ticketing systems. As a consequence, the individual ticketing systems are not required to be configured with logic enabling them to communicate with the other ticketing systems, nor do the individual ticketing systems need to even be aware of the other ticketing systems. Rather, the logic for translating between various formats of service request messages as well as the logic for routing the service request messages between ticketing systems can reside in the centralized service request processing component 300. This, in turn, allows for ticketing systems to be more easily added and removed from the environment, as the ticketing systems themselves do not require specialized logic for communicating with each of the other ticketing systems.

Figure 5:
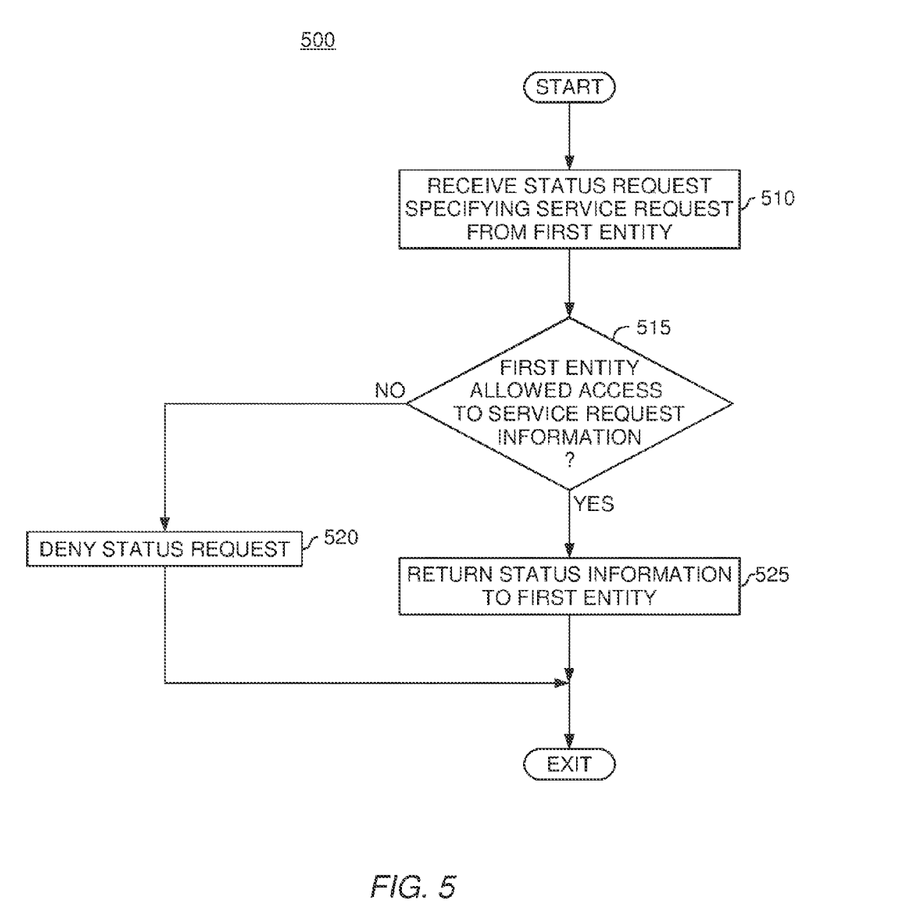
FIG. 5 is a flow diagram illustrating a method for processing queries for service information, according to one embodiment described herein.

FIG. 5 is a flow diagram illustrating a method for processing queries for service information, according to one embodiment described herein. As shown, the method 500 begins at step 510, where the service request processing component 300 receives a status request specifying service request information to be returned. Examples of such service request information include, without limitation, the status of a pending service request, the party currently responsible for handling a pending service request, information on how an issue related to a closed service request was ultimately resolved, and so on. More generally, it is contemplated that any request related to a pending or closed service request could be used, consistent with the functionality described herein.

The service request processing component 300 then determines whether the first entity from which the status request was received is authorized to access the requested information (step 515). Such a determination could include, for instance, authentication and authorization analysis for the first entity. If the service request processing component 300 determines that the first entity is not allowed to access the requested information, the service request processing component 300 denies the status request (step 520) and the method 500 ends. Such a denial may occur, for instance, if the first entity is unable to be authenticated and/or authorized to access the requested information. In denying the status request, the service request processing component 300 could be configured to transmit a reason for the denial to the first entity. If instead the service request processing component 300 determines that the first entity is allowed to access the requested information, the service request processing component 300 returns the requested status information to the first entity (step 525) and the method 500 ends.

Figure 6:
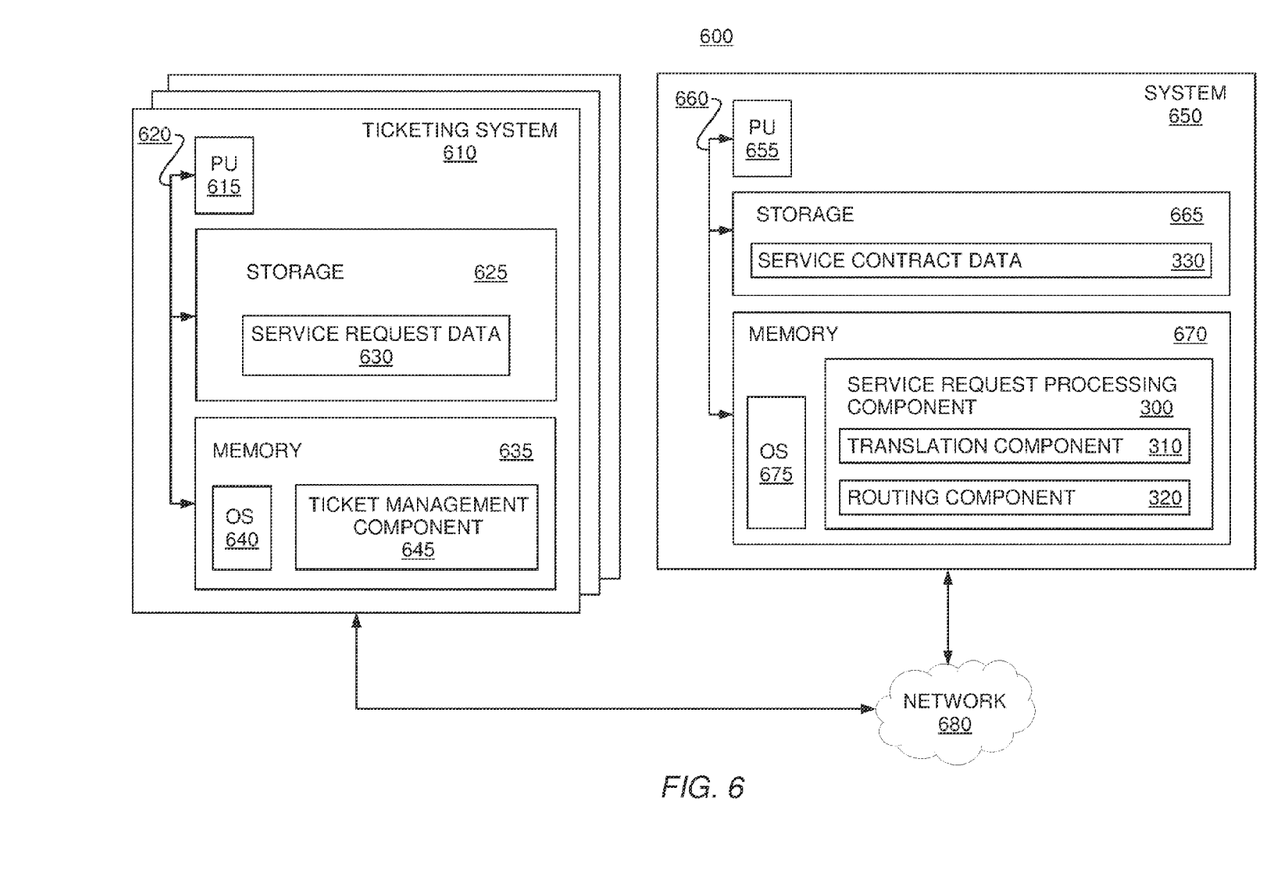
FIG. 6 is a block diagram illustrating a system configured with a service request processing component, according to one embodiment described herein.

FIG. 6 is a block diagram illustrating a system configured with a service request processing component, according to one embodiment described herein. As shown, network environment 600 includes ticketing systems 610, a network 680 and a central service request processing system 650. In one embodiment, the environment 600 may include existing computer systems, e.g., desktop computers, server computers, laptop computers, tablet computers, gaming consoles, handheld gaming devices and the like. The network environment 600 illustrated in FIG. 6, however, is merely an example of one network environment in which embodiments may be used. Embodiments may be implemented differently, regardless of whether the computer systems are complex multi-user computing systems, such as a cluster of individual computers connected by a high-speed network, single-user workstations or network appliances lacking non-volatile storage.

As shown, each ticketing system 610 includes a processing unit 615, which obtains instructions and data via a bus 620 from a memory 635 and storage 625. Processing unit 615 is a programmable logic device that performs instruction, logic and mathematical processing, and may be representative of one or more CPUs. Storage 625 stores application programs and data for use by network device 610. As shown, storage 625 includes service request data 630. Generally, the service request data 630 represents data relating to pending service requests. As discussed above, each ticketing system 610 may maintain such data 630 using a respective format. The memory 635 is any memory sufficiently large to hold the necessary programs and data structures. Memory 635 could be one or a combination of memory devices, including Random Access Memory, nonvolatile or backup memory (e.g., programmable or Flash memories, read-only memories, etc.). In addition, memory 635 and storage 625 may be considered to include memory physically located elsewhere; for example, on another computer coupled to the ticketing system 610 via bus 620.

Examples of storage 625 include, without limitation, harddisk drives, flash memory devices, optical media and the like. Ticketing system 610 is operably connected to the network 680. Memory 635 includes an operating system (OS) 640 and a ticket management component 645. Generally, the ticket management component 645 is configured to transmit and receive service request message to and from the central service request processing system 650. Operating system 640 is the software used for managing the operation of the network device 610. Examples of OS 640 include UNIX, a version of the Microsoft Windows® operating system, and distributions of the Linux® operating system. (Note: Linux is a trademark of Linus Torvalds in the United States and other countries.) Additionally, OS 640 may be an operating system specially developed for network devices, such as Cisco IOS®.

As shown, the central service request processing system 650 includes the same basic hardware elements as the ticketing systems 610. Specifically, the central service request processing system 650 includes a processing unit 655 (representative of one or more CPUs and/or GPUs), a memory 670 and storage 665 connected via a bus 660. The central service request processing system 650 may be operably connected to the network 680, which generally represents any kind of data communications network. Accordingly, the network 680 may represent both local and wide area networks, including the Internet.

The storage 665 contains service contract data 330. As discussed above, the service contract data 330 may generally contain information on service requests and the service agreements under which these service requests originated. For instance, the service contract data 330 could specify a list of pending service requests, information on the status of the various service requests, a list of closed service requests, information on the parties involved in the service agreement and the responsibilities of these parties, items covered by a service agreement, and so on.

The memory 670 contains an OS 675 and a service request processing component 300. The service request processing component 300, in turn, contains a translation component 310 and a routing component 320. Generally, the service request processing component 300 manages the flow of service request messages between each of the various ticketing systems 610. For example, the service request processing component 300 could receive a service request message from a first one of the ticketing systems 610 and could translate the received service request message to a standardized format. That is, since the service request processing component 300 may maintain portions of the service contract data 330 using a certain format, the translation component 310 could translate information within the received service request message into this certain format for use in parsing the received message. The routing component 320 could then access the service contract data 330 to determine another one of the ticketing systems 610 to route the service request message to. Such a determination could be based on, for example, a current status of the service request associated with the service request message, the ticketing system 610 from which the service request message was received, the obligations of one or more parties under the service agreement (i.e., as represented in the service contract data), and so on.

Once the other ticketing system to transmit the service request message to is determined, the translation component 310 could translate the service request message into a second format recognized by the other ticketing system. The routing component 320 could then transmit the translated service request message to the other ticketing system. Advantageously, doing so provides centralized logic for processing and routing service requests, which enables each of the ticketing systems 610 to operate without requiring specialized logic for communicating with each of the other ticketing systems 610. As a result, this simplifies the networking logic required to implement the service request management system and further allows for ticketing systems to be more easily added and removed from the environment.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a service request processing component 300 could execute on a computing system in the cloud and could receive service request messages from a plurality of ticketing systems. In such a case, the service request processing component 300 could receive messages from the ticketing systems and could translate the received messages to a standardized format. The service request processing component 300 could further determine another one or more of the ticketing systems to route the service request message to and could translate the service request message into a second format consistent with the determined one or more other ticketing systems. The service request processing component 300 could then transmit the translated service request message to the one or more other ticketing systems. Additionally, the service request processing component 300 could process user queries for service request information gathered from processing the service request messages and could return the requested information to the users. Doing so allows for users to access the service request status information from any computing system attached to a network connected to the cloud (e.g., the Internet).

As an additional example, the individual ticketing systems used by each of the parties could be deployed onto various computing systems within the cloud together with the service request processing component 300. Doing so may enable the ticketing systems to more quickly pass requests and information to one another via the service request processing component 300. Furthermore, the cloud could be maintained by one of the parties (e.g., the vendor), who could provide access to the various other parties (e.g., partners and customers) as part of the service agreement.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to particular embodiments, other and further embodiments may be devised without departing from the basic scope thereof. In view of the foregoing, the scope of the present disclosure is determined by the claims that follow.

We claim:

1. A central service request management system for managing service requests across a plurality of ticketing systems, comprising:
    a communications system containing computer program code that, when executed, provides an interface through which the plurality of ticketing systems submit service request messages;
    translation logic for translating the service request messages to a standardized format, wherein each service request message corresponds to one of a plurality of distinct service requests;
    data storage logic for maintaining a status of each of the plurality of distinct service requests and for updating the maintained statuses based on the translated service request messages, wherein each of the maintained statuses specifies a history of actions taken for the respective service request; and
    routing logic which, for each translated service request message:
        identifies a service agreement, of a plurality of service agreements, that corresponds to the respective translated service request message, based on first data within the respective translated service request message, wherein each of the plurality of service agreements comprises a respective escalation schedule specifying responsibilities of a plurality of entities for taking actions for service requests under the respective service agreement, wherein each of the plurality of entities corresponds to a respective one of the plurality of ticketing systems;
        determines, by operation of one or more computer processors, a respective one of the plurality of ticketing systems to transmit the respective translated service request message to, based on (i) second data of the respective translated service request message and (ii) a comparison of the maintained status of the service request of the plurality of distinct service requests corresponding to the respective translated service request message, with the respective escalation schedule of the determined service agreement; and
        transmits the translated service request message to the determined ticketing system.

2. The central service request management system of claim 1, wherein the translation logic is further configured to convert the translated service request message from the standardized format to a second format used by the identified ticketing system, and wherein the routing logic is configured to transmit the converted service request message in the second format to the identified ticketing system.

3. The central service request management system of claim 2, wherein each of the plurality of ticketing systems is configured to send and receive service request messages in a respective data format, and wherein the respective data formats for at least two of the plurality of ticketing systems are distinct relative to each other.

4. The central service request management system of claim 1, wherein the data storage logic for maintaining a status of service requests is further configured to:
    identifying a previous status of a first service request associated with the service request message;
    determining an updated status of the first service request, based on the previous status and the translated service request message;
    accessing the updated service request status, wherein the central service request management system determines whether a second service request relates to the first service request; and
    upon determining the second service request, assigning the second service request to a second ticketing system of the plurality of ticketing systems, wherein the second service request is configured to the translation logic and the message is translated to a format recognized by the second ticketing system.

5. The central service request management system of claim 1, further comprising:
    query processing logic for receiving a query specifying service request information from a requesting entity and for transmitting, in response to receiving the query, the specified service request information to the requesting entity.

6. The central service request management system of claim 5, wherein the query processing logic is further configured to authenticate the requesting entity and to transmit the specified service request information to the requesting entity only upon determining that the authenticated requesting entity is authorized to access the specified service request information.

7. The central service request management system of claim 1, wherein the data storage logic further maintains resolution information for resolved service requests, the resolution information indicating one or more actions taken in order to resolve the respective service request, and further comprising:
    analysis logic for processing the resolution information to detect patterns in how groups of similar service requests were resolved, wherein the resolution information generates notification messages of predicted issues and preventative measures; and
    recommendation logic to transmit notification messages to one or more parties, specifying one or more recommended actions for resolving at least one issue based on the detected resolution patterns.

8. A method for managing service requests across a plurality of ticketing systems, comprising:
    receiving a service request message from the plurality of ticketing systems;

translating the received service request messages to a standardized format, wherein each service request message corresponds to one of a plurality of distinct service requests;

maintaining a status of each of the plurality of distinct service requests and for updating the maintained statuses based on the translated service request messages, wherein each of the maintained statuses specifies a history of actions taken for the respective service request;

for each translated service request message:

determining a service agreement, of a plurality of service agreements, that corresponds to the respective translated service request message, based on first data within the respective translated service request message, wherein each of the plurality of service agreements comprises a respective escalation schedule specifying responsibilities of a plurality of entities for taking actions for service requests under the respective service agreement, wherein each of the plurality of entities corresponds to a respective one of the plurality of ticketing systems;

determining a respective one of the plurality of ticketing systems to transmit the respective translated service request message to, based on (i) second data of the respective translated service request message and (ii) a comparison of the maintained status of the service request of the plurality of distinct service requests corresponding to the respective translated service request message, with the respective escalation schedule of the determined service agreement; and transmitting the translated service request message to the determined ticketing system.

9. The method of claim 8, further comprising:

converting the translated service request message from the standardized format to a second format used by the identified ticketing system, and wherein transmitting the translated service request message further comprises transmitting the converted service request message in the second format to the identified ticketing system.

10. The method of claim 8, wherein maintaining a status of service requests further comprises:

identifying a previous status of a first service request associated with the service request message;

determining an updated status of the first service request, based on the previous status and the translated service request message;

accessing the updated service request status to determine whether a second service request relates to the first service request; and upon determining the second service request, assigning the second service request to a second ticketing system of the plurality of ticketing systems.

11. The method of claim 8, further comprising:

receiving a query specifying service request information from a requesting entity; and transmitting, in response to receiving the query, the specified service request information to the requesting entity.

12. The method of claim 11, further comprising:

authenticating the requesting entity, wherein the specified service request information is transmitted to the requesting entity only upon determining that the authenticated requesting entity is authorized to access the specified service request information.

13. The method of claim 8, further comprising:

maintaining resolution information for resolved service requests, the resolution information indicating one or more actions taken in order to resolve the respective service request;

processing the resolution information to detect patterns in how groups of similar service requests were resolved, wherein the resolution information generates notification messages of predicted issues and preventative measures; and transmitting notification messages to one or more parties, specifying one or more recommended actions for resolving at least one issue based on the detected resolution patterns.

14. A computer program product for managing service requests across a plurality of ticketing systems, comprising:

computer code that receives service request messages from the plurality of ticketing systems;

computer code that translates the received service request messages to a standardized format, wherein each service request message corresponds to one of a plurality of distinct service requests;

computer code that maintains a status of each of the plurality of distinct service requests and for updating the maintained statuses based on the translated service request messages, wherein each of the maintained statuses specifies a history of actions taken for the respective service request;

computer code that, for each translated service request message:

determines a service agreement, of a plurality of service agreements, that corresponds to the respective translated service request message, based on first data within the respective translated service request message, wherein each of the plurality of service agreements comprises a respective escalation schedule specifying responsibilities of a plurality of entities for taking actions for service requests under the respective service agreement, wherein each of the plurality of entities corresponds to a respective one of the plurality of ticketing systems;

determines a respective one of the plurality of ticketing systems to transmit the respective translated service request message to, based on (i) second data of the respective translated service request message and (ii) a comparison of the maintained status of the service request of the plurality of distinct service requests corresponding to the respective translated service request message, with the respective escalation schedule of the determined service agreement; and transmits the translated service request message to the determined ticketing system; and a non-transitory computer-readable medium that stores the computer codes.

15. The non-transitory computer program product of claim 14, further comprising:

computer code that converts the translated service request message from the standardized format to a second format used by the identified ticketing system, and wherein the computer code that transmits the translated service request message is further configured to transmit the converted service request message in the second format to the identified ticketing system.

16. The non-transitory computer program product of claim 14, wherein the computer code that maintains a status of service requests further comprises:
- computer code that identifies a previous status of a first service request associated with the service request message;
- computer code that determines an updated status of the first service request, based on the previous status and the translated service request message;
- computer code that accesses the updated service request status to determine whether a second service request relates to the first service request; and
- computer code that upon determining the second service request, assigns the second service request to a second ticketing system of the plurality of ticketing systems.

17. The non-transitory computer program product of claim 14, further comprising:
- computer code that receives a query specifying service request information from a requesting entity; and
- computer code that transmits, in response to receiving the query, the specified service request information to the requesting entity.

18. The non-transitory computer program product of claim 17, further comprising:
- computer code that authenticates the requesting entity, wherein the specified service request information is transmitted to the requesting entity only upon determining that the authenticated requesting entity is authorized to access the specified service request information.

19. The non-transitory computer program product of claim 14, further comprising:
- computer code that maintains resolution information for resolved service requests, the resolution information indicating one or more actions taken in order to resolve the respective service request;
- computer code that processes the resolution information to detect patterns in how groups of similar service requests were resolved, wherein the resolution information generates notification messages of predicted issues and preventative measures; and
- computer code that transmits notification messages to one or more parties, specifying one or more recommended actions for resolving at least one issue based on the detected resolution patterns.

* * * * *